Patented May 9, 1944

2,348,557

UNITED STATES PATENT OFFICE 2,348,557

TREATMENT OF HYDROCARBON DISTILLATES

William J. Mattox, Chicago, Ill., assignor to Universal Oil Products Company, Chicago, Ill., a corporation of Delaware No Drawing. Application October 17, 1940, Serial No. 361,583

8 Claims. (Cl. 196—50)

This invention relates to the treatment of hydrocarbon distillates of approximate gasoline boiling range produced from petroleum, and is more specifically concerned with the catalytic refining of such distillates under hydrogenating conditions and under the influence of selective catalysts to improve their antiknock properties although the treatment has other desirable effects in that color, odor, and boiling range are improved.

Straight run gasolines and naphthas produced by simple non-cracking distillation of crude petroleums consist almost entirely of naphthene and paraffin hydrocarbons in varying proportions, the distribution and characteristics of these groups of hydrocarbons determining generally the antiknock value of the gasoline. In the case of the naphthene hydrocarbons, those having 5, 6, and 7 carbon atoms in the ring may be present, and of paraffin hydrocarbons, both those of normal and isomeric character. The most desirable hydrocarbons in motor fuels and particularly in aviation fuels have been shown to be the more highly branched iso-paraffins boiling within the range of approximately 100–400° F., the reference standard iso-octane, 2,2,4-trimethyl pentane being a case in point. Owing to the generally low antiknock values of straight run gasolines except possibly some of those from the California and Gulf Coastal fields, they are quite uniformly subjected to so-called reforming processes which may involve simple thermal cracking or treatments employing selected catalysts to direct the course of the conversion reactions toward higher antiknock values with improved yields of gasoline boiling range product. The present process is a contribution to the art of reforming gasolines employing special catalysts and conditions of operation in respect to temperature, pressure, times of reaction, hydrogen atmosphere, and stage operation.

In one specific embodiment the present invention comprises a method for reforming gasolines of relatively low antiknock value to increase the antiknock value thereof which consists in subjecting the gasoline mixed with hydrogen to contact with selected hydrogenating catalysts at temperatures of the order of 475–525° C. (890–980° F.) pressures of the order of 100–300 pounds per square inch and liquid space velocities of approximately 0.5 to 20 in a primary stage, and further subjecting the products from the primary stage in the presence of hydrogen to further contact with dehydrogenating catalysts at temperatures of the order of 525–600° C. (980–1112° F.), pressures of the order of atmospheric to 60 pounds per square inch and liquid space velocities of the order of 0.1 to 10 in a second stage.

I have determined that improved results in the hydroreforming of low antiknock value straight run gasolines are obtainable when the treatment is conducted in stages under conditions of increased severity in respect to dehydrogenation than when single stage operation employing intermediate conditions is used. While it is not intended to limit the invention by any exposition of theoretical reaction mechanisms which might account for the improved effects observed, there is evidence to support the theory that the unexpected results obtained may be due to the destructive hydrogenation of 5-carbon atom ring naphthenes under the conditions employed in the first stage of the process, these compounds being converted into iso-paraffins by hydrogenation reactions involving the opening of the ring. At the same time there may be some dehydrogenation of 6-carbon atom ring naphthenes to aromatics. There is also experimental evidence to indicate that when catalysts and conditions suitable to dehydrogenate and cyclize aliphatic hydrocarbons are employed on mixtures of gasoline hydrocarbons comprising both naphthenes and paraffins that the five-carbon atom naphthenes present are extensively decomposed with the liberation of large amounts of carbon and gas. Thus, if a single stage method of treatment is employed in the catalytic reforming of many gasolines containing both five carbon atom ring naphthenes and aliphatic hydrocarbons, there is a rapid deposition of carbonaceous materials on the catalyst even under the influence of a hydrogenating atmosphere so that frequent reactivations are necessary with a consequent decrease in the overall production of the equipment. Later examples will be introduced to indicate the advantages of operating in the present preferred step-wise manner rather than in a single stage. Advantages may also be gained at times in operating in a succession of more than two stages with conditions modified along the line of flow so that dehydrogenation and dehydrocyclization reactions are progressively favored.

When it has been indicated that rather narrow temperature and pressure ranges are generally preferable in the two-stage operation, it is not intended to limit the invention in accordance with these ranges on account of the extremely variable character of the gasolines which may be subjected to treatment. Thus in a primary stage, temperatures as low as 200° C. and as high as 600° C. may sometimes be used and pressures may vary from 100–1000 pounds per square inch. In the second stage temperatures from 450 to 650° C. may be used and pressures from substantially atmospheric to approximately 200 pounds per square inch. The general conditions for successful operation are that the set of conditions employed in the second stage (including catalysts) tend to induce a greater degree of dehydrogenation and/or dehydrocyclization rather than hydrogenation or in other words to shift the hydrogenation-dehydrogenation equilibrium in the direction of the latter reaction.

As a further means of controlling the relative hydrogenating-dehydrogenating equilibria which differentiate the first and second stages, it is comprised within the scope of the invention to employ considerable variations in space or mass velocities as related to temperature in the two stages of the process. The selection of the proper mass velocity, which in continuous apparatus may be varied by varying the diameters of reaction chambers in respect to their length, will have a definite effect in further reducing carbon deposition as will be indicated in later examples. The following tabulation indicates three possible alternative modes of operation employing a two-stage process to effect optimum results in the increasing of antiknock value of gasolines by two-stage hydroreforming operations.

| Alternative processes | Stage | Pressure, lbs. per square inch | Temp., °C. | Feed rate | Molal hydrogen ratio |
|---|---|---|---|---|---|
| I | 1 | High pressure 100–1,000 | 200–550 | 0.5 to 20 S. V.[1] | 0.5–40 |
|   | 2 | Atm.–200 | 500–650 | 0.1 to 5 S. V.[1] | 0.5–40 |
| II | 1 | Atm.–200 | 200–550 | High S. V.[1] 2–20 | 0.5–40 |
|   | 2 | Same as I |   |   |   |
| III | 1 | Atm.–200 | 200–550 | High mass velocity | 0.5–40 |
|   | 2 | Same as I |   |   |   |

[1] Hourly liquid space velocity.

It is noted that in general the pressure is higher in the first stage of operation, that the temperature is lower and that the space velocity is higher, while the hydrogen ratio may be varied to accommodate the needs of different stocks.

A considerable number of catalysts may be successfully employed in the two stages of the process although not with exactly equivalent results and either the same type of catalyst may be used in the two stages or different catalysts of varying activity. Thus a distinctly hydrogenating catalyst such at nickel, cobalt, or platinum may be used in the primary stage while essentially dehydrogenating catalysts including the oxides of the left-hand members of the groups IV, V and VI of the periodic table—preferably on supports—in the secondary stage. It is further comprised within the scope of the invention to employ the same catalyst in both stages, while depending upon the variation in operating conditions to effect the desired results. Any of the catalysts may be supported on such relatively inactive carriers as the oxides of aluminum, magnesium, zinc, silica, or siliceous and generally refractory materials, including clays, either raw or acid treated, fuller's earth or synthetically prepared silica-alumina composites. The selection of the best catalysts for use in the successive stages of the treatment will be determined by the characteristics of the gasoline to be reformed and the results desired.

With respect to the hydrogen-hydrocarbon ratios, these will also be varied to suit the needs of different situations with respect to charge and results desired but generally no additional hydrogen will be employed in the secondary or later stages.

Various types of apparatus and modes of operation may be employed within the scope of the invention. In one of the simpler modes of operation, a low octane number gasoline is vaporized, mixed with a controlled amount of hydrogen, and introduced into a reactor containing a granular hydrogenation-dehydrogenation catalyst, the reactor being maintained at a given temperature and pressure, usually determined by small scale experiments. The rate of flow is adjusted to increase the octane number of the charge to only a limited extent corresponding to a minimum deposition of carbon, the further increase being reserved for the second stage of operation.

After the first stage of treatment the total products may be passed directly to dehydrogenation treatment or may be subjected to intermediate fractionation with the separation of gaseous and liquid conversion products and the selection of individual cuts for further treatment. In general the operation of the second stage and the apparatus employed therefor will be generally the same as that of the first stage and consists of a vaporizer if the liquid products have been condensed, or simply a further section of reactor containing catalyst in case the total products have been passed to further treatment without fractionation. After the second, or final stage, in case more than two are employed, the products are fractionated to recover reformed gasoline fractions and hydrogen-containing gases which may be recycled for further use.

Whether the first stage of operation will require the extraction of heat to maintain the temperature due to hydrogenation of 5-carbon atom ring naphthenes or will require the addition of heat due to dehydrogenation of 6-carbon atom ring naphthenes will in general depend on the relative amounts of these two types of naphthenes.

Owing to the fact that there is generally a lower rate of carbon deposition in the first stage of the process, it is frequently possible to utilize the catalytic material of the first stage after a period of operation as a catalyst for the second stage since its activity in respect to dehydrogenation under the more severe conditions of the second stage may be sufficiently high while it has depreciated to an undesirable extent for the first stage hydrogenation reactions. It is obvious that this offers advantages as to capacity of apparatus and that numerous flows can be devised using parallel reaction chambers to take advantage of this feature The following examples are introduced to show the type of results obtainable by the use of the present process, although not with the intent of limiting its proper scope.

EXAMPLE I

In a first stage a 33.5 octane number, 198–405 F. boiling range Mid-Continent naphtha was passed with 4 moles of added hydrogen over an 8% chromium sesquioxide–92% alumina catalyst at 500° C., 2 liquid space velocity, and 300 pound pressure for six hours. The liquid recover amounted to 97.0 volume per cent and had a octane number of 40.5. Only 0.005% of the charge was converted to carbon on the catalyst.

The hydrocarbon recovered from the above first stage was passed with 4 moles of hydrogen over a portion of the above 8% chromium sesquioxide catalyst at 550° C., 0.5 space velocity, and 50 pounds for six hours. The volume of liquid recovered amounted to 83.5% of the charge to the second stage or 81.0% of the charge to the first stage. The octane number of the reformed naphtha from this stage was 76.0. Carbon formation amounted to 1.0% of the charge. The overall results of these two operations are summarized in the following table. Data from a run made under the same operating conditions as for the above second stage but without the first stage of the operation are also included in the table.

|  | Two-stage operation | One-stage operation |
|---|---|---|
| Yields, per cent of charge: |  |  |
| Gasoline, vol. per cent | 81.0 | 79.0 |
| Gasoline, wt. per cent | 83.0 | 82.3 |
| Gas, uncondensed, wt. per cent | 13.2 | 15.7 |
| PP-BB | 0.0 | 0.9 |
| Carbon | 0.98 | 2.3 |
| Unaccounted | −2.8 | +1.2 |
| Carbon deposition, wt. per cent of cat. | 2.5 | 5.4 |
| Octane number, M. M. | 76.0 | 80.0 |

From the above data the marked decrease in carbon formation will be noted. Although the octane number of the gasoline from the two-stage operation is 4 octane numbers lower than resulted from the one stage, the yield is higher. Producing a 76 octane number gasoline in a one-stage operation gave 1.5% carbon, so that by either comparison the carbon formation for a similar degree of conversion has been greatly reduced by the operation described.

EXAMPLE II

The first stage of this typical treatment was conducted in the same manner as Example I.

A portion of the hydrocarbons recovered from the first stage was passed with 2 moles of hydrogen over an 8% $Cr_2O_3$-92% $Al_2O_3$ catalyst at 550° C., 0.5 space velocity, and 50 pounds for six hours. It will be noted that this operation differs from Example I in that only 2 moles of hydrogen are used. The overall yields of these two operations are summarized in the table following. Data from a one-stage run made at 550° C., 0.5 space velocity, 50 pounds pressure and with 2 moles of hydrogen are included in the table for comparison.

|  | Two-stage | One-stage |
|---|---|---|
| Run number | 575-1034 | 981 |
| Yields, per cent of charge: |  |  |
| Gasoline, vol. per cent | 75.0 | 76.2 |
| Gasoline, wt. per cent | 77.7 | 78.8 |
| Gas, uncondensed, wt. per cent | 20.9 | 19.5 |
| PP-BB |  | 1.2 |
| Carbon | 2.13 | 3.95 |
| Unaccounted | +0.7 | +3.5 |
| Carbon deposition, wt. per cent cat. | 5.1 | 8.8 |
| Octane number, M. M. | 80.5 | 80.0 |

In this two-stage operation a slightly higher octane number, 80.5, gasoline was produced than by the one-stage and with about the same yield, carbon formation however being only about one-half as much as in the one-stage operation. However, the results obtained in Example I in which 4 moles of added hydrogen were used in the second stage are better in view of the 0.98% carbon.

EXAMPLE III

In this example the two stages were carried out as a single operation, the two furnaces used being controlled separately. The total products from the first were passed through a reducing valve directly to the second without any intermediate separation. In this run the temperature in the first stage was 475° C., while the second was held at 550° C. A 78 vol. % yield of 80 octane number gasoline was obtained with only 1.9% carbon. Producing an 80 octane number gasoline in a one stage operation, with approximately 4 moles of exit hydrogen (1.93 mols added hydrogen) the yield was only 76 vol. % and the carbon deposit on the catalyst 3.95 wt. % of the charge. Thus, as shown in this example, by reforming straight run naphtha according to the procedure described in this invention carbon formation has been greatly reduced.

EXAMPLE IV

By reforming a 198–405° F. boiling range Mid-Continent naphtha according to the procedure described above the following results have been obtained:

Catalyst: 8% $Cr_2O_3$-92% $Al_2O_3$, 1/8" pellets
Pressure: 50 pounds, both stages
Temperature: 525° C., 1st stage; 550° C., 2nd stage
Hydrogen added: 4 mols/mol. of charge

|  | Run number | | | |
|---|---|---|---|---|
|  | 1 | 2 | 3 | 4 |
| Stage number | 1  2 | 1  2 | 1  2 | 1  2 |
| Space vel., each stage | 1.98–0.46 | 2.72–0.68 | 4.03–1.01 | 1.54–0.77 |
| Space vel., overall | 0.40 | 0.55 | 0.81 | 0.51 |
| Gasoline yield, vol. per cent | 74.5 | 78.6 | 80.0 | 78.1 |
| Octane number, M. M. | 82.5 | 81.0 | 79.5 | 80.5 |
| Carbon, wt. per cent of chg.: Two stage | 1.5 | 1.8 | 1.3 | 1.0 |
| (Carbon, wt. per cent of charge, for same octane number by one-stage process with 4 mols. added hydrogen) | 3.0 | 2.5 | 2.2 | 2.4 |

The greatly decreased carbon formation will be noted in the above experiments.

In order to produce 80 octane number gasoline in the usual one-stage operation at 550° C. the liquid space velocity must be 0.5 or less. In this two-stage procedure, 80 octane number gasoline has been produced at an overall space velocity of 0.81.

EXAMPLE V

Catalyst: 8% $Cr_2O_3$-92% $Al_2O_3$, 1/8" pellets in both stages
Pressure: 50 pounds, in both stages
Temperature: 550° C. in both stages

|  | Run number | | | |
|---|---|---|---|---|
|  | 1 | 2 | 3 | 4 |
| Hydrogen added, mols./mol. chg. | 4 | 4 | 8 | 8 |
| Stage number | 1  2 | 1  2 | 1  2 | (²) |
| Space vel., each stage | 4.0–1.0 | 2.74–0.69 | 2.70–0.68 | --- |
| Space velocity overall | 0.80 | 0.55 | 0.54 | 0.45 |
| Gasoline yield, vol. per cent of chg | 81.2 | 72.5 | 80.2 | 77.0 |
| Octane number, M. M. | 77.5 | 82.0 | 81.0 | 81.0 |
| Carbon, wt. per cent of chg.: Two stage | 1.1 | 2.3 | 0.5 | --- |
| (One stage—4 mols hydrogen) | (1.7) | (2.8) | (¹ 1.3) | (¹ 1.3) |

¹ 8 mols hydrogen.
² One-stage run.

A considerable reduction in carbon formation was obtained in these experiments, the reduction amounting to over 60% in run No. 3. A one-stage run, No. 4, is included in the above table for comparison.

I claim as my invention:

1. A process for improving the antiknock characteristics of hydrocarbon distillates comprising gasoline fractions containing naphthenes having five carbon atoms in the ring, which comprises subjecting the hydrocarbon distillate to the action of hydrogen at hydrogenating conditions of temperature, pressure and space velocity, and in the presence of a hydrogenating catalyst to convert said naphthenes into open-chain, aliphatic hydrocarbons, and subjecting the resultant conversion products to reforming in the presence of a dehydrogenating catalyst.

2. The process of claim 1 further characterized in that the reforming step is accomplished at a higher temperature than that maintained in the first mentioned conversion step.

3. The process of claim 1 further characterized in that the reforming step is carried out in the presence of hydrogen.

4. The process of claim 1 further characterized in that the reforming step is operated at a pressure lower than that employed in the first mentioned conversion step.

5. The process of claim 1 further characterized in that the hydrogenating catalyst comprises nickel and the dehydrogenating catalyst comprises alumina and chromia.

6. A process for improving the antiknock characteristics of hydrocarbon distillates comprising gasoline fractions containing naphthenes having five carbon atoms in the ring, which comprises subjecting the hydrocarbon distillate to the action of hydrogen at hydrogenating conditions of temperature, pressure and space velocity, and in the presence of a hydrogenating catalyst to convert said naphthenes into open-chain, aliphatic hydrocarbons, and subjecting the resultant conversion products, including the unused hydrogen from the hydrogenating step, to the action of a dehydrogenating catalyst at reforming conditions of temperature and pressure to produce gasoline of high octane rating.

7. A process for reforming gasoline of relatively low octane number to improve the octane number thereof which comprises subjecting the vapors of said gasoline mixed with hydrogen at a temperature of from about 475 to about 525° C., a pressure of from about 100 to about 300 pounds per square inch and at a liquid hourly space velocity of from about 0.5 to about 20 to contact in a first stage with a catalyst consisting of nickel deposited on kieselguhr, effective in converting naphthenes to paraffins by hydrogenation, and in the second stage at a temperature from about 525 to about 600° C., a pressure of from about atmospheric to about 100 pounds per square inch and a liquid hourly space velocity of from about 0.1 to about 10 to contact with a catalyst consisting of molybdenum oxide deposited on alumina effective in dehydrogenating aliphatic hydrocarbons to cyclic hydrocarbons, the space velocity in said second stage being lower than in said first stage.

8. A process for reforming gasoline of relatively low octane number to improve the octane number thereof which comprises subjecting the vapors of said gasoline mixed with hydrogen at a temperature of from about 475 to about 525° C., a pressure of from about 100 to about 300 pounds per square inch and at a liquid hourly space velocity of from about 0.5 to about 20 to contact in a first stage with a catalyst consisting of nickel deposited on kieselguhr, effective in converting naphthenes to paraffins by hydrogenation, and in the second stage at a temperature from about 525 to about 600° C., a pressure of from about atmospheric to about 100 pounds per square inch and a liquid hourly space velocity of from about 0.1 to about 10 to contact with a catalyst consisting of vanadium oxide deposited on alumina effective in dehydrogenating aliphatic hydrocarbons to cyclic hydrocarbons, the space velocity in said second stage being lower than in said first stage.

WILLIAM J. MATTOX.